United States Patent
Kim

(10) Patent No.: US 11,268,650 B2
(45) Date of Patent: Mar. 8, 2022

(54) ROTATABLE STAND FOR LCD MONITOR

(71) Applicant: SFB LOGITEL INC., Seoul (KR)

(72) Inventor: Hyung Gyu Kim, Seoul (KR)

(73) Assignee: SFB LOGITEL INC., Seoul (KR)

( * ) Notice: Subject to any disclaimer, the term of this patent is extended or adjusted under 35 U.S.C. 154(b) by 0 days.

(21) Appl. No.: 16/971,298

(22) PCT Filed: Feb. 26, 2019

(86) PCT No.: PCT/KR2019/002309
§ 371 (c)(1),
(2) Date: Aug. 19, 2020

(87) PCT Pub. No.: WO2019/164378
PCT Pub. Date: Aug. 29, 2019

(65) Prior Publication Data
US 2020/0393078 A1    Dec. 17, 2020

(30) Foreign Application Priority Data

Feb. 26, 2018  (KR) .......................... 10-2018-0022704
Jun. 29, 2018  (KR) .......................... 10-2018-0075277

(51) Int. Cl.
*F16M 11/08*  (2006.01)
*F16M 11/18*  (2006.01)
*G06F 1/16*   (2006.01)

(52) U.S. Cl.
CPC ............. *F16M 11/08* (2013.01); *F16M 11/18* (2013.01); *G06F 1/1601* (2013.01); *A47B 2200/0088* (2013.01)

(58) Field of Classification Search
CPC ................. A47B 21/04; A47B 2200/0088; F16M 11/08; F16M 11/2014
USPC ............................................. 248/349.1
See application file for complete search history.

(56) References Cited

U.S. PATENT DOCUMENTS

| | | | | |
|---|---|---|---|---|
| 3,462,112 A | * | 8/1969 | Novak | H01R 35/02 248/349.1 |
| 5,715,954 A | | 2/1998 | Zaremba | |
| 6,463,946 B1 | * | 10/2002 | Wu | A47B 11/00 108/50.12 |
| 6,477,918 B2 | * | 11/2002 | Sakamoto | F16M 11/18 475/149 |
| 7,229,057 B2 | * | 6/2007 | Cavell | A47G 25/06 211/115 |
| 7,887,015 B2 | * | 2/2011 | Gillespie | F16M 11/08 248/220.21 |

(Continued)

FOREIGN PATENT DOCUMENTS

JP  2004-150515 A   5/2004
KR  10-0787642 B1   12/2007

(Continued)

*Primary Examiner* — Bradley Duckworth
(74) *Attorney, Agent, or Firm* — Patent Office of Dr. Chung Park

(57) ABSTRACT

The present invention relates to a rotatable stand for an LCD monitor and the purpose thereof is to apply a rotating body having a specific structure to the LCD monitor, which is installed on a table therethrough, so as to enable the LCD monitor to freely and continuously make a full 360-degree rotation in left and right directions, while the conventional fixed structure of the LCD monitor is being maintained.

2 Claims, 10 Drawing Sheets

(56) References Cited

U.S. PATENT DOCUMENTS

| | | | |
|---|---|---|---|
| 9,575,346 B2* | 2/2017 | Tseng | F16M 11/2014 |
| 9,599,276 B2* | 3/2017 | Grziwok | F16M 11/2014 |
| 9,936,823 B2* | 4/2018 | Galant | A47F 3/002 |
| 10,258,026 B2* | 4/2019 | Thomas | F16M 11/2014 |
| 2007/0278361 A1* | 12/2007 | May | F16M 11/10 248/126 |

FOREIGN PATENT DOCUMENTS

| | | |
|---|---|---|
| KR | 10-2011-0075887 A | 7/2011 |
| KR | 10-1525109 B1 | 6/2015 |

\* cited by examiner

ROTATABLE STAND FOR LCD MONITOR

CROSS-REFERENCE TO PRIOR APPLICATIONS

This application is a national Stage Patent Application of PCT International Patent Application No. PCT/KR2019/002309, filed on Feb. 26, 2019 under 35 U.S.C. § 371, which claims priority of Korean Patent Application Nos. 10-2018-0022704, filed on Feb. 26, 2018 and 10-2018-0075277, filed on Jun. 29, 2018, which are all hereby incorporated by reference in their entirety.

TECHNICAL FIELD

The present invention relates to a rotatable stand for an LCD monitor, and more particularly, to a rotatable stand for an LCD monitor that is capable of allowing the LCD monitor installed on a table therethrough to be freely rotated by a user according to an environment using the LCD monitor.

BACKGROUND ART

Generally, an LCD monitor is adapted to display given images received from the outside through an LCD panel located on a front surface thereof in a state where an LCD module is built in a given frame.

In case of an LCD monitor for advertisement which is fixed in the form of a stand or an LCD monitor for a casino poker table or roulette, particularly, the LCD monitor is fixed to top of a general pipe-shaped stand.

The conventional LCD monitor, which provides display screens on one surface, double surfaces, or multi surfaces thereof so as to efficiently transfer information, is built on a table, and in this case, however, the information is transferred only in one side direction where the LCD monitor is fixed, so that there is a user's definite need for information transfer in every direction through the LCD monitor's free rotations.

As mentioned above, however, the conventional LCD monitor fixed to the table through the stand has to have a separate rotary device configured complicatedly to provide rotations in left and right directions thereof.

In case of the LCD monitor fixed to top of the stand, especially, it has a load of 10 to 20 kg, and accordingly, the stand should have a firm structure resisting such a load. Further, the stand has to have a full 360-degree rotation in left and right direction according to a user's need and also has to provide an excellent spatial and visual appearance in a state of being built on the table.

DISCLOSURE

Technical Problem

Accordingly, the present invention has been made in view of the above-mentioned problems occurring in the related art, and it is an object of the present invention to provide a rotatable stand for an LCD monitor that is configured to apply a rotary member having a specific structure to the LCD monitor installed on a table therethrough, so that the LCD monitor can be freely and continuously rotated by 360° in left and right directions, even while having the conventional structure fixed to the table.

Technical Solution

To accomplish the above-mentioned object, according to the present invention, there is provided a rotatable stand for an LCD monitor, which is built on a table on which an installation hole is punched, in a state where the LCD monitor is fixed to top thereof, in such a manner as to be selectively rotated, the rotatable stand including: a rod member having a shape of a pipe having a given length in such a manner as to allow the LCD monitor to be fixedly located onto top thereof; a rotary bearing fitted to a given height position of the rod member in such a manner as to be engagingly rotated with the rod member; a seating member fixedly seated onto the table on which the LCD monitor is located and having a pipe-shaped insertion part adapted to pass through the installation hole of the table and a support part extended from top end periphery of the insertion part to the form of a flange in such a manner as to allow the rotary bearing to be seatedly rotated on the center thereof, the support part and the insertion part being selectively coupled to or separated from each other by means of screw thread structures formed correspondingly on an inner top periphery of the insertion part and the outer peripheral surface of the support part corresponding to the inner top periphery of the insertion part; and a cover member adapted to be covered on the seating member onto which the rotary bearing is seated in a state where the rod member passes therethrough, wherein the rod member has a first stepped projection formed on the given height position where the rotary bearing is fitted in such a manner as to be reduced in diameter to restrict a fitting position of the rotary bearing onto the rod member and a snap ring installation groove concavely formed on an outer peripheral surface thereof below the fitting position of the rotary bearing in such a manner as to allow a snap ring to be fixed thereto, and the insertion part of the seating member has a pair of support bearings built therein in such a manner as to be spaced apart from each other by a given distance through an insertion pipe to support a rotary shaft of the rod member passing through the seating member upon the rotation of the rod member.

Advantageous Effects

According to the present invention, the rotatable stand for an LCD monitor is configured to provide the rotary member having a specific structure for one, double, or multi-sided LCD monitor installed on the table therethrough, so that the LCD monitor can be continuously and fully rotated by 360° in a user's desired direction, even while having the conventional structure fixed to the table.

Particularly, the rotary member for rotating the LCD monitor has a rigid structure sufficiently resisting a load of a high weight industrial LCD monitor, provides smooth and natural rotations, and is capable of being easily mounted or demounted on and from the LCD monitor, thereby optimizing the user's satisfaction through.

MODE FOR INVENTION

Hereinafter, an explanation on a rotatable stand for an LCD monitor according to the present invention will be given in detail with reference to the attached drawings.

First, a rotatable stand for an LCD monitor according to the present invention is configured to apply a rotary member having a specific structure to the LCD monitor installed on a table therethrough, so as to enable the LCD monitor to freely and continuously make a full 360-degree rotation in left and right directions.

Figure 1:
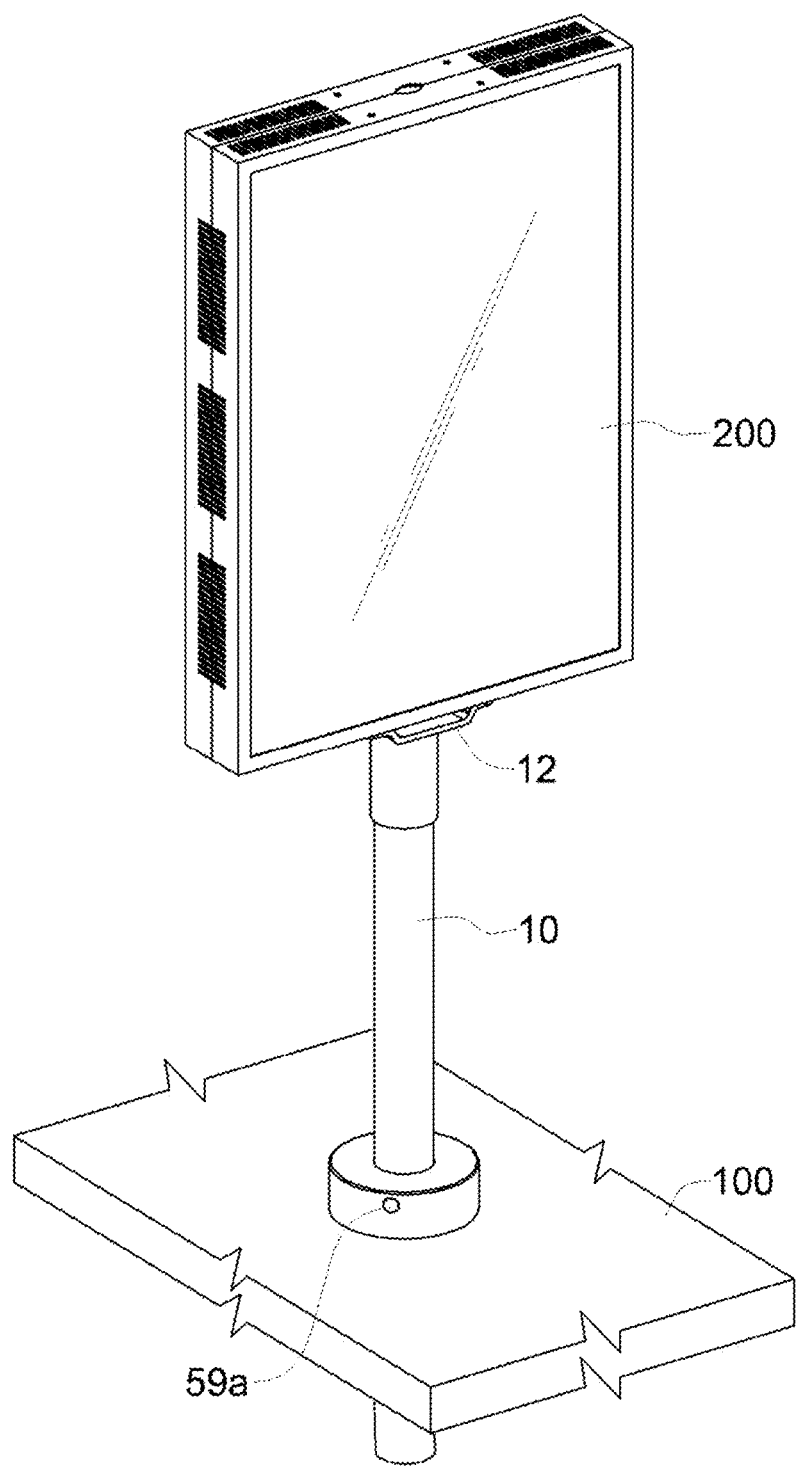
FIG. 1 is a perspective view showing a rotatable stand for an LCD monitor according to one embodiment of the present invention.
Figure 2:
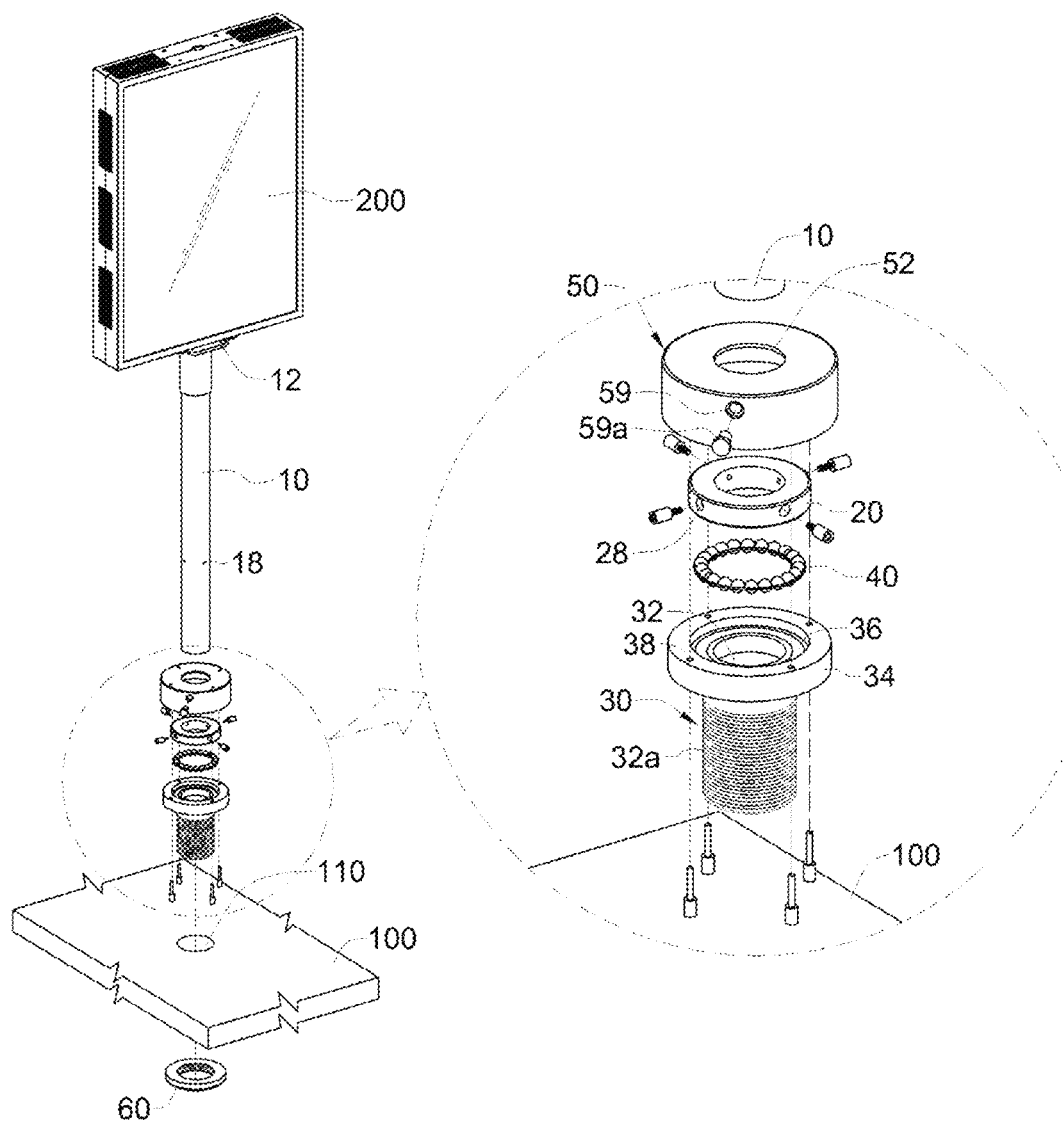
FIG. 2 is an exploded perspective view showing the rotatable stand for an LCD monitor according to one embodiment of the present invention.
Figure 3:
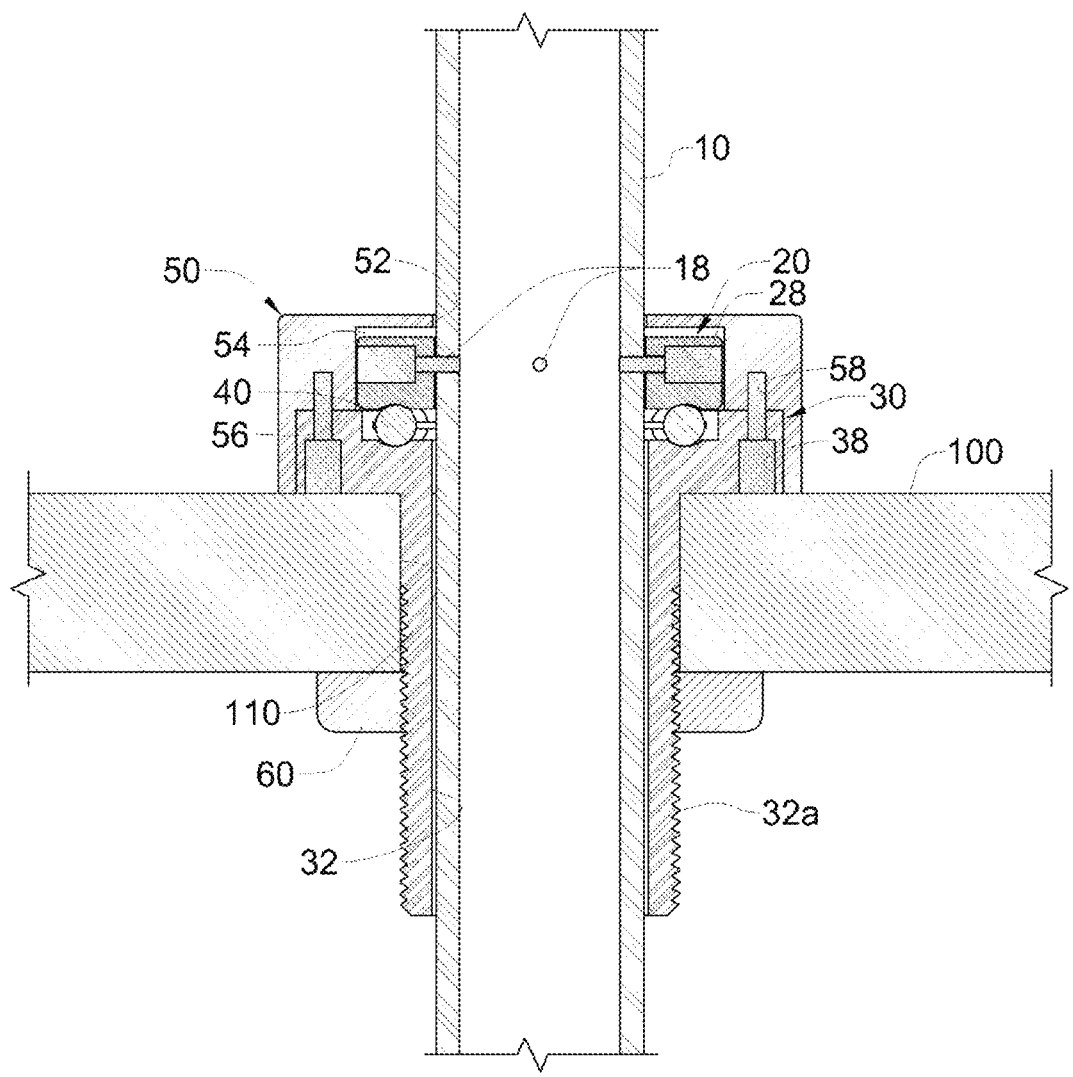
FIG. 3 is a front sectional view showing the rotatable stand for an LCD monitor according to one embodiment of the present invention.

To do this, as shown in FIGS. 1 to 3, a rotatable stand for an LCD monitor according to one embodiment of the present invention is configured to have a rotary member 20 having a specific structure, a seating member 30, a cover member 50, and a fixing member 60 selectively mounted on a pipe-shaped rod member 10 whose top is coupled to one, double, or multi-sided LCD monitor 200 and is thus installed on a table 100 having an installation hole 110 punched thereinto, thereby providing a rotational function for the LCD monitor 200.

The rod member 10 has a shape of a pipe having given length and diameter and includes an installation plate 12 having various structures formed integrally with top end periphery thereof so as to allow at least one or more LCD monitors 200 having various sizes to be built thereon and a plurality of screw fastening holes 18 formed on an outer peripheral surface thereof at a given height position thereof so as to allow the rotary member 20 to be coupled thereto.

The rotary member 20 has a shape of a ring having a plurality of screw fastening holes 28 penetratedly formed on an outer peripheral surface thereof in such a manner as to be fixedly coupled to the given height position of the rod member 10 through screw fastening and to be thus engagingly rotated with the rod member 10, and in this case, the rotary member 20 has a circular guide groove 22 formed on the underside thereof in such a manner as to be easily seatedly rotated on top of a circular bearing 40 as will be discussed later.

The seating member 30 is fixedly seated onto the table 100 on which the LCD monitor 200 is built and includes a pipe-shaped insertion part 32 adapted to pass through the installation hole 110 of the table 100 and a support part 34 extended from top end periphery of the insertion part to the form of about flange in such a manner as to have a shape of a ring having a given diameter to allow the rotary member 20 to be seatedly rotated on top thereof.

In this case, the insertion part 32 of the seating member 30 has a screw thread 32a formed on an outer peripheral surface thereof in such a manner as to be fastened to the fixing member 60, and the support part 34 of the seating member 30 has a circular bearing installation groove 36 formed on top surface thereof in such a manner as to have a given depth, so that the circular bearing 40 is located in the bearing installation groove 35 to provide a gentle rotating force for the rotary member 20 seated on top thereof.

Further, the support part 34 of the seating member 30 has a plurality of screw fastening holes 38 punched on an outer periphery of the underside thereof so as to be screw-coupled to the cover member 50.

The cover member 50 is covered on the seating member 30 onto which the rotary member 20 is seated in the state where the rod member 10 passes therethrough, thereby providing a good outer appearance for the rotatable stand. The cover member 50 has a shape of a general cylinder whose underside is open and is configured to have a through hole 52 formed at a center of top thereof so as to allow the rod member 10 to pass therethrough.

Further, the cover member 50 includes a first circular groove 54 formed on an inner upper periphery thereof so as to correspond to an outer shape of the rotary member and a second circular groove 56 formed on an inner lower periphery thereof so as to correspond to an outer shape of the support part 34 of the seating member 30, and the second circular groove 56 has a plurality of screw fastening holes 58 formed on a ceiling portion thereof so as to allow screws passing through the screw fastening holes 38 of the support part 34 of the seating member 30 to be fastened to the ceiling portion of the second circular groove 56, so that a state where the seating member 30 and the cover member 50 are integrally coupled to each other, while the rotary member 20 is being built therein, can be firmly maintained.

The cover member 50 has one or a plurality of openings 59 formed on an outer peripheral surface thereof in such a manner as to communicate with the first circular groove 54, and through the openings 59, screws of the rotary member 20, which are coupled to the rod member 10, can be fastened or unfastened. In this case, stoppers 59a having shapes corresponding to the openings 59 are mounted on the openings 59, thereby providing a good outer appearance for the rotatable stand.

The fixing member 60 has a shape of a general ring having a screw thread formed on an inner peripheral surface thereof and is fastened to the screw thread 32a formed on the outer peripheral surface of the insertion part 32 of the seating member 30 passing through the installation hole 110 of the table 100 so as to rigidly restrict the rod member 10 and the seating member 30, the rotary member 20 and the cover member 50 coupled integrally with the rod member 10.

Figure 6:
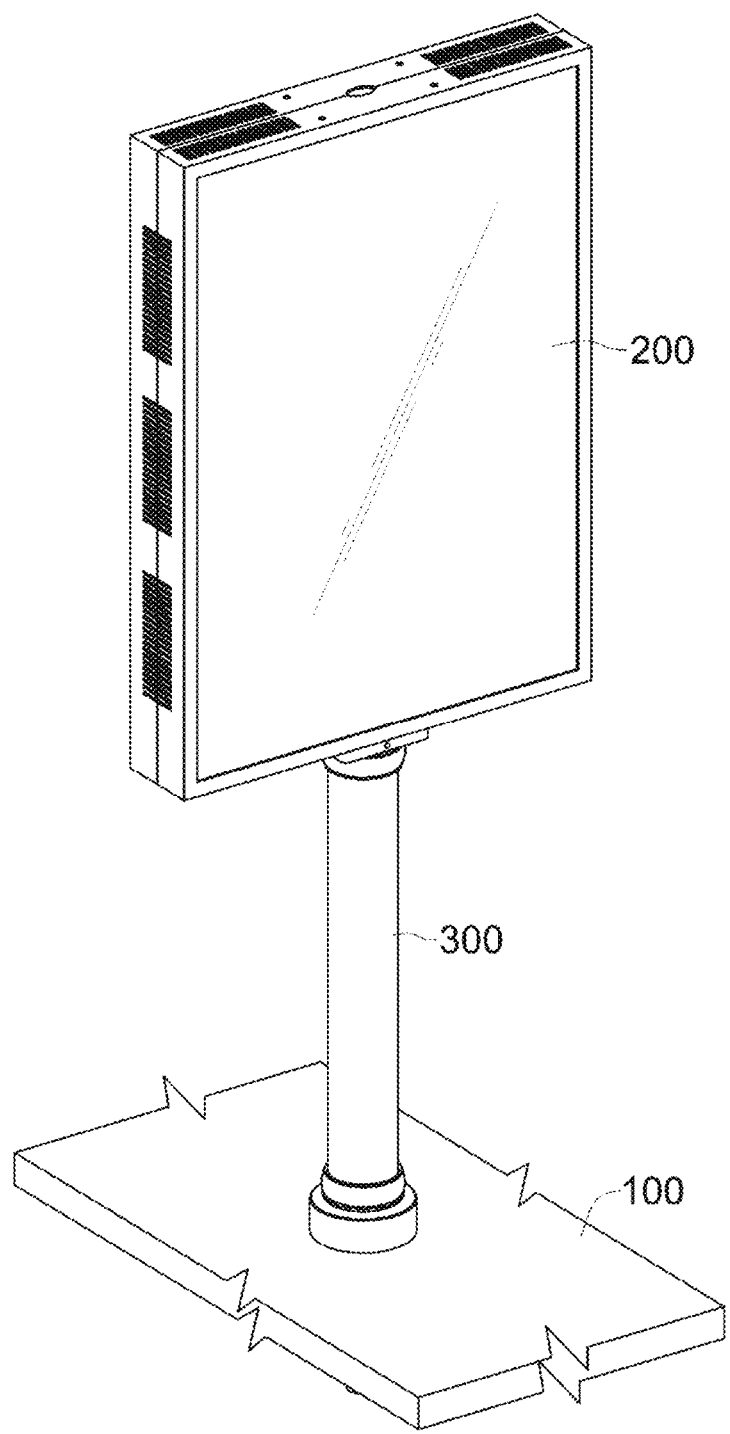
FIG. 6 is a perspective view showing a rotatable stand for an LCD monitor according to another embodiment of the present invention.
Figure 7:
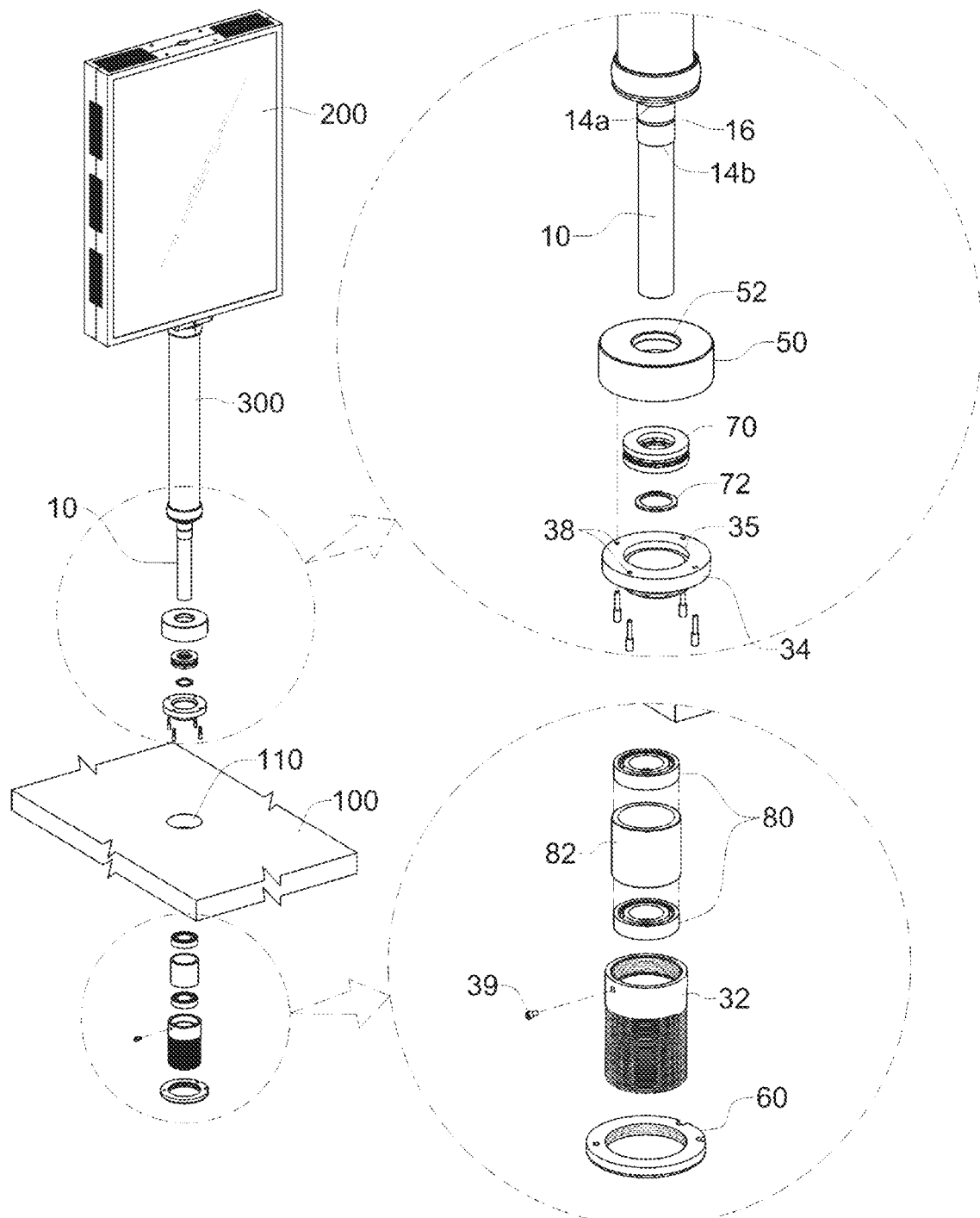
FIG. 7 is an exploded perspective view showing the rotatable stand for an LCD monitor according to another embodiment of the present invention.
Figure 8:
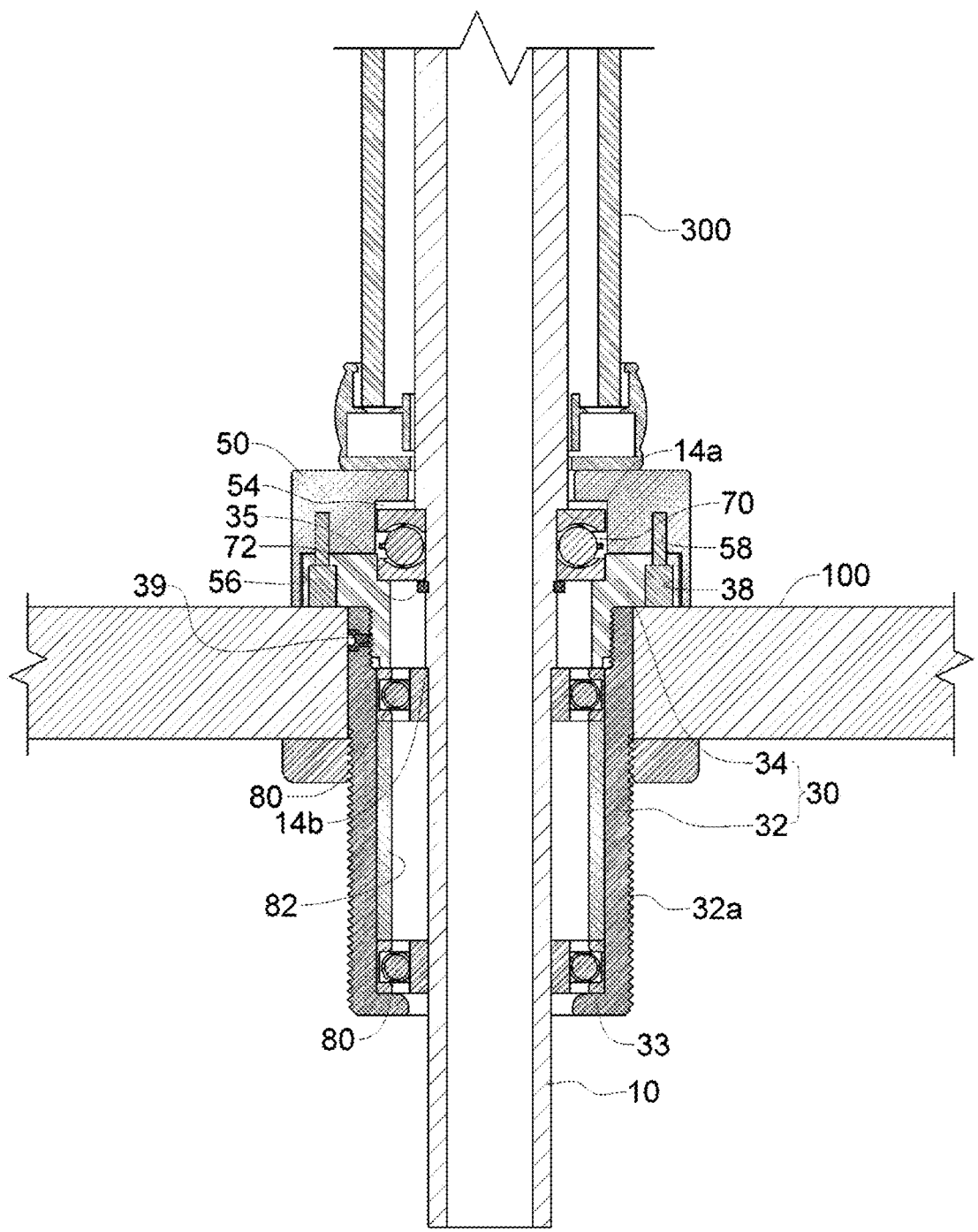
FIG. 8 is a front sectional view showing the rotatable stand for an LCD monitor according to another embodiment of the present invention.

On the other hand, as shown in FIGS. 6 to 8, a rotatable stand for an LCD monitor according to another embodiment of the present invention is configured to have a rotary bearing 70 press-fitted to a given height position of a rod member 10 whose top is coupled to the LCD monitor 200 in such a manner as to be engagingly rotated with the rod member 10.

The rotary bearing 70 is constituted of a thrust ball bearing and is thus adapted to allow the rod member 10 to be gently rotated. In this case, the rod member 10 has a first stepped projection 14a formed on the given height position thereof in such a manner as to be reduced in diameter to restrict a fitting position of the rotary bearing 70 onto the rod member 10.

The rod member 10 has a snap ring installation groove concavely formed on an outer peripheral surface thereof below the fitting position of the rotary bearing in such a manner as to allow a snap ring 72 to be fixed thereto, and through the installation of the snap ring 72, arbitrary escape of the rotary bearing 70 is prevented and upward escape of a structure inclusive of the rod member 10 is also prevented.

In a state where a seating member 30 is fixed to a table 100 on which the LCD monitor 200 is built, the rod member 10 passes through the seating member 30, and the seating member 30 includes a pipe-shaped insertion part adapted to pass through an installation hole 110 of the table 100 and a support part 34 extended from top end periphery of the insertion part 32 to a sectional shape of a general "τ" so as to allow the rotary member 20 to be seatedly rotated on top thereof.

The support part 34 of the seating member 30, through which the road member 10 passes, has a rotary bearing seating portion 35 protruding from an inner peripheral surface thereof so as to allow the rotary bearing 70 to be fixedly seated thereonto.

According to another embodiment of the present invention, the support part 34 and the insertion part 32 of the seating member 30 are selectively coupled to or separated from each other by means of screw thread structures formed correspondingly on an inner top periphery of the insertion part 32 and the outer peripheral surface of the support part 34 corresponding to the inner top periphery of the insertion part 32.

Further, a pair of support bearings 80 is built in the insertion part 32 so as to support a shaft of the rod member 10 passing through the seating member 30 upon the rotation of the rod member 10, and the pair of support bearings 80 has a shape of a pipe and is spaced apart from each other by a given distance through an insertion pipe 82.

Furthermore, the bottom portion of the insertion part 32, through which the lower end periphery of the rod member 10 passes, has a support bearing seating portion adapted to seat the lower side support bearing 80 thereon.

The pair of support bearings 80 is desirably constituted of single-row deep groove ball bearings, and outer peripheral surfaces of the support bearings 80, the inner peripheral surface of the insertion part 32, inner peripheral surfaces of the support bearings 80, and an outer peripheral surface of the rod member 10 have sizes corresponding to one another, thereby maintaining the firm contact states among them to prevent their arbitrary movements due to gaps among them.

A reference numeral 14b indicates a second stepped projection formed on a given height position of the rod member 10 in such a manner as to be reduced in diameter to restrict a fitting position of the upper support bearing 80 onto the rod member 10.

Further, a reference numeral 39 indicates a pressurizing screw adapted to allow a state where the insertion part 32 and the support part 34 are fastened to each other to be firmly maintained upon coupling between the insertion part 32 and the support part 34 through the screw thread structures.

Furthermore, the insertion part 32 of the seating member 30 has a screw thread 32a formed on the outer peripheral surface thereof in such a manner as to be fastened to a fixing member 60, and the support part 34 has a plurality of screw fastening holes 38 penetratedly formed on an outer periphery of the underside thereof so as to be screw-coupled to a cover member 50.

The cover member 50 is covered on the seating member 30 in the state where the rod member 10 to which the rotary bearing 70 is fitted passes therethrough, thereby providing a good outer appearance for the rotatable stand. The cover member 50 has a shape of a general cylinder whose underside is open and is configured to have a through hole 52 formed at a center of top thereof so as to allow the rod member 10 to pass therethrough.

Further, the cover member 50 includes a first circular groove 54 formed on an inner upper side thereof so as to correspond to an outer shape of the rotary bearing 70 and a second circular groove 56 formed on an inner lower side thereof so as to correspond to an outer shape of the support part 34 of the seating member 30.

The second circular groove 56 has a plurality of screw fastening holes 58 formed on a ceiling portion thereof so as to allow screws passing through the screw fastening holes 38 of the support part 34 of the seating member 30 to be fastened to the ceiling portion of the second circular groove 56.

The fixing member 60 has a shape of a general ring having a screw thread formed on an inner peripheral surface thereof and is fastened to the screw thread 32a formed on the outer peripheral surface of the insertion part 32 of the seating member 30 passing through the installation hole 110 of the table 100.

A reference numeral 300 indicates a lighting device that is located at a given position of the rod member 10 in such a manner as to be selectively operated to provide an excellent aesthetic sense for the rod member 10 onto which the LCD monitor 200 is built.

Next, an explanation on an operation of the rotatable stand for an LCD monitor according to the present invention will be in detail given.

The rotatable stand for an LCD monitor according to one embodiment of the present invention is located on top of the table 100 in a state where one, double, or multi-sided LCD monitor 200 is built on top of the rod member 10 through the installation plate 12, thereby supporting the LCD monitor 200.

In this case, the cover member 50 fittedly passes through the lower peripheral end of the rod member 10, and after that, the rotary member 20 is fixedly coupled to the given height position of the rod member 10 below the cover member 50. Next, the seating member 30 fittedly passes through the rod member 10 below the rotary member 20.

In the state where the cover member 50 and the seating member 30 are located on top and underside of the rotary member 20, accordingly, the screw fastening holes 38 of the seating member 30 communicate with the screw fastening holes 58 of the cover member 50, and a plurality of screws is fastened to the screw fastening holes 38 and the screw fastening holes 58, so that in the state where the rotary member 20 is built in the given height position of the rod member 10, the seating member on which the bearing 40 is located and the cover member 50 have an integral body with each other. In this case, the rod member 10 can be freely rotated by 360° in left and right directions.

After that, the insertion part 32 of the seating member 30, which has an integral body with the rod member 10, passes through the installation hole 110 formed on the table 100 on which the LCD monitor 200 is built, and next, the fixing member 60 is fastened to the outer peripheral surface of the insertion part 32, so that the LCD monitor 200 built on top of the rod member 10 can be rotatable on the table 100 through the rotary member 20 fixedly fitted to the rod member 10.

In this case, the rod member 10 on which the LCD monitor 200 is built can be prevented from escaping upward and arbitrarily moving by means of the screw coupling between the seating member 30 and the cover member 50 and the fastening of the fixing member 60 to the seating member 30, thereby maintaining the firmly fixed state to the LCD monitor 200. Further, only the outer peripheral surface of the cover member 50 is exposed to top of the table 100, and the coupled portions of the rotatable stand are all hidden, thereby providing a good outer appearance.

Figure 4A:
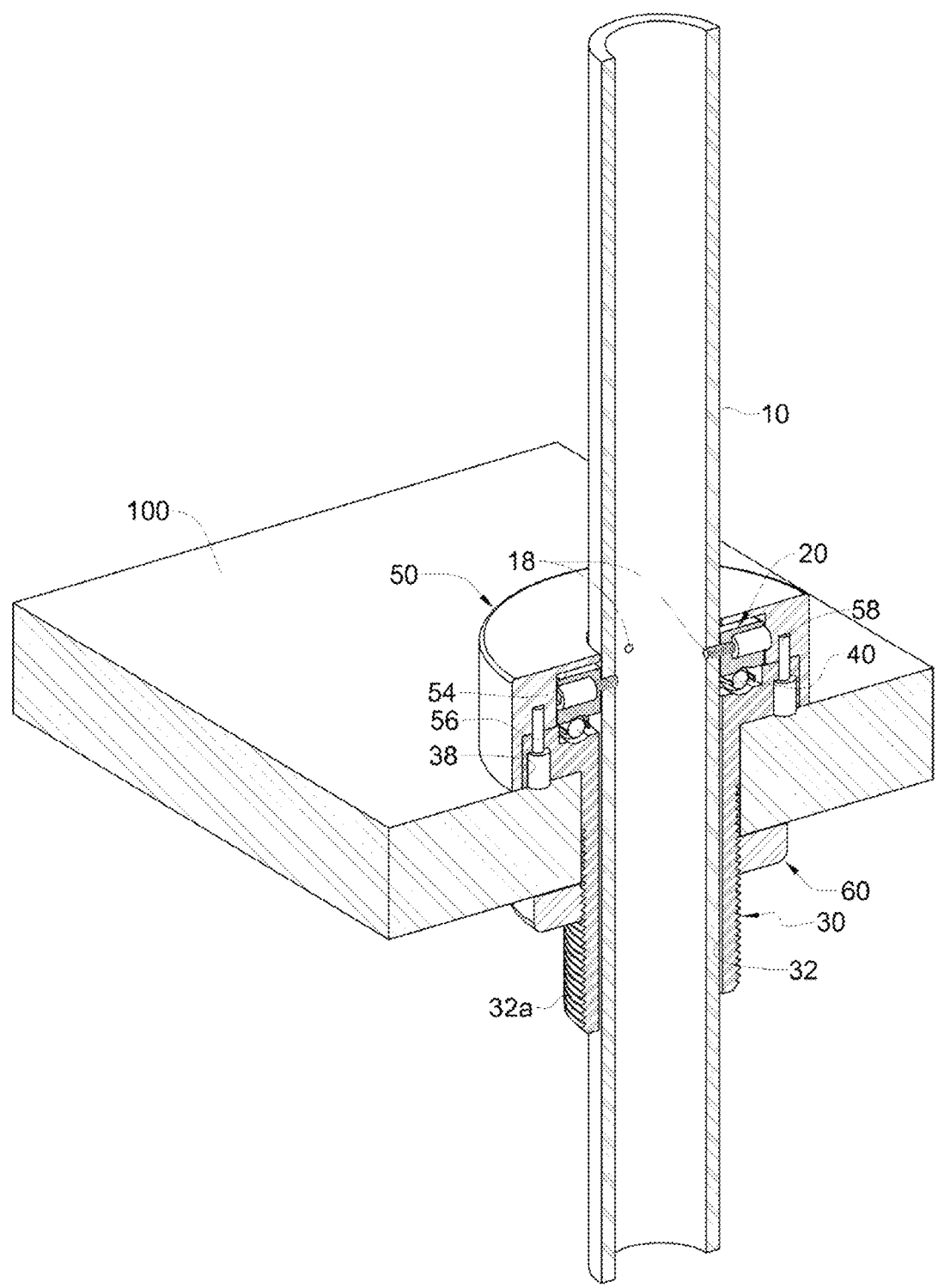
FIGS. 4A and 4B are sectional views showing use states of the rotatable stand for an LCD monitor according to one embodiment of the present invention.
Figure 4B:
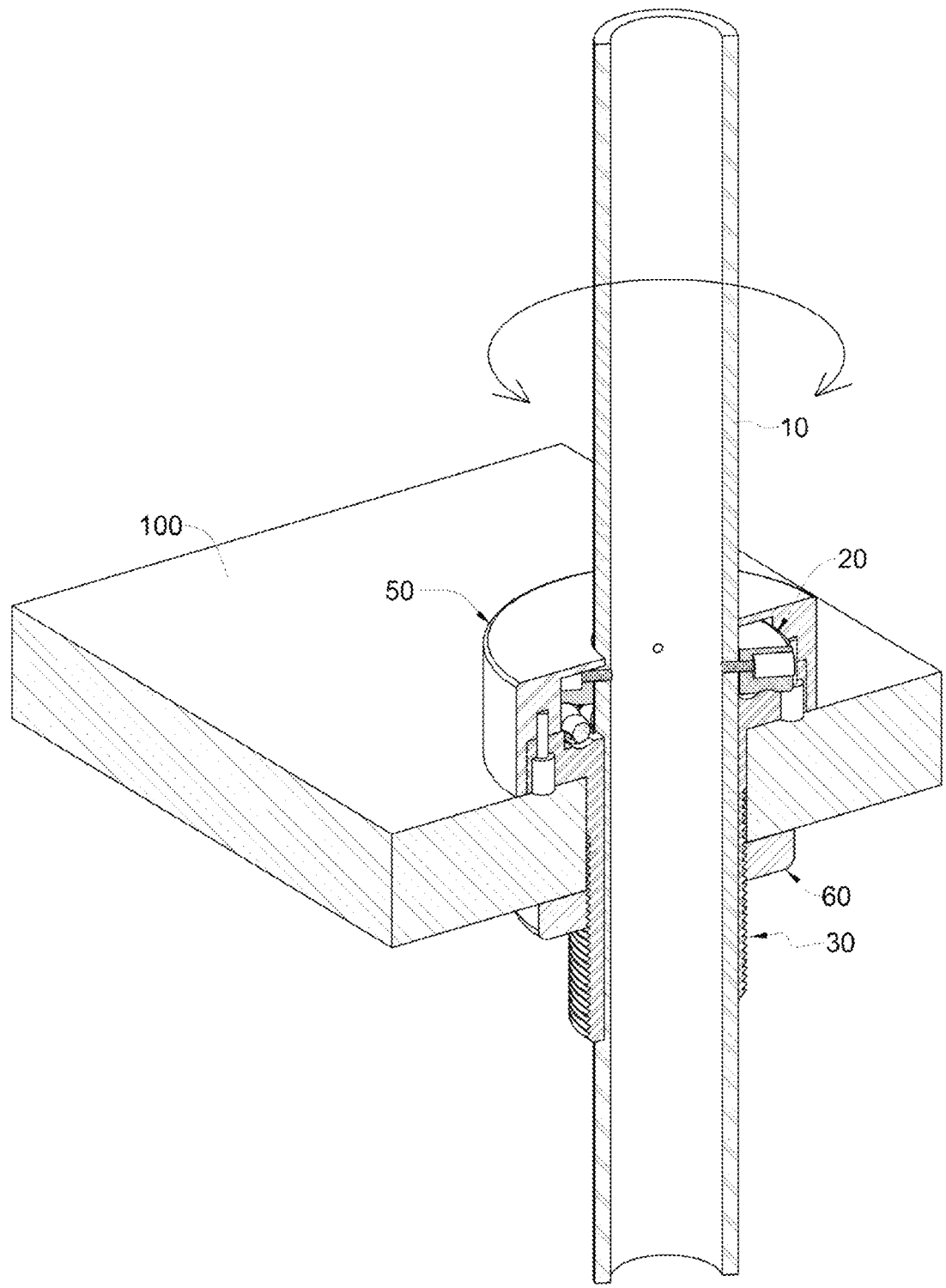
Figure 5A:
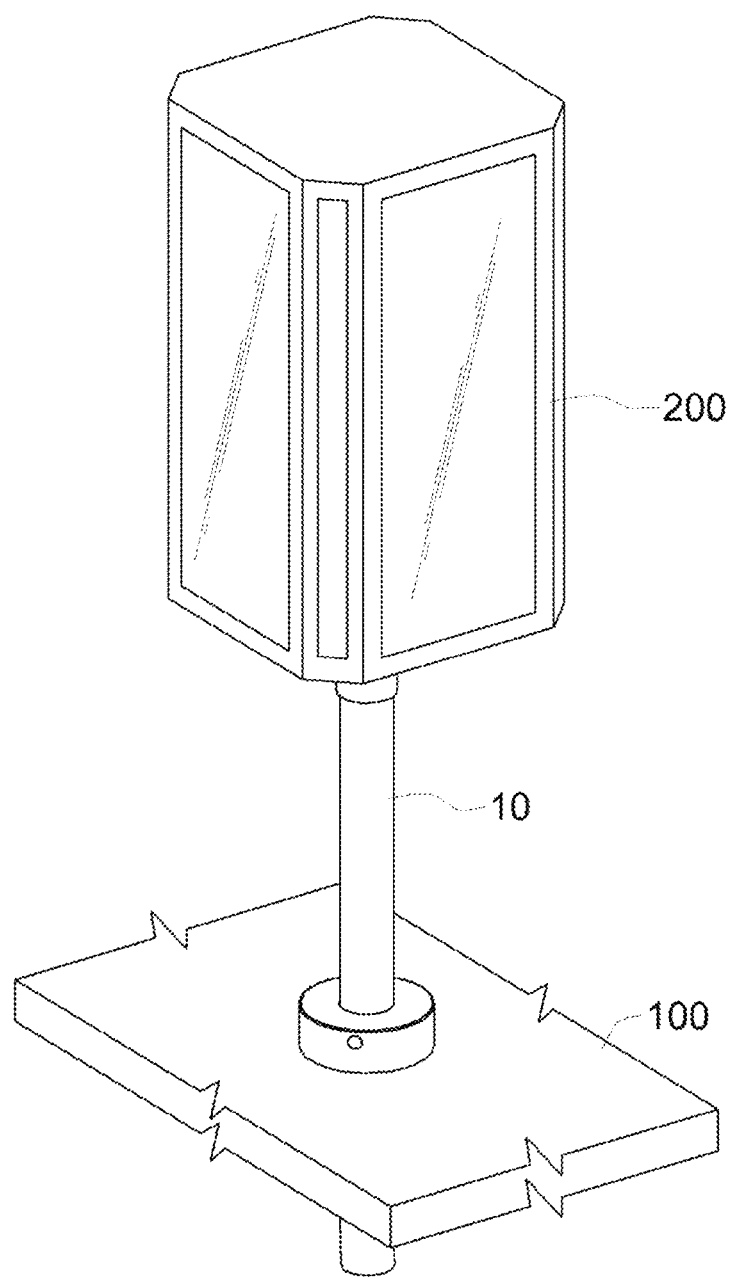
FIGS. 5A and 5B are perspective views showing use states of the rotatable stand for an LCD monitor according to one embodiment of the present invention.
Figure 5B:
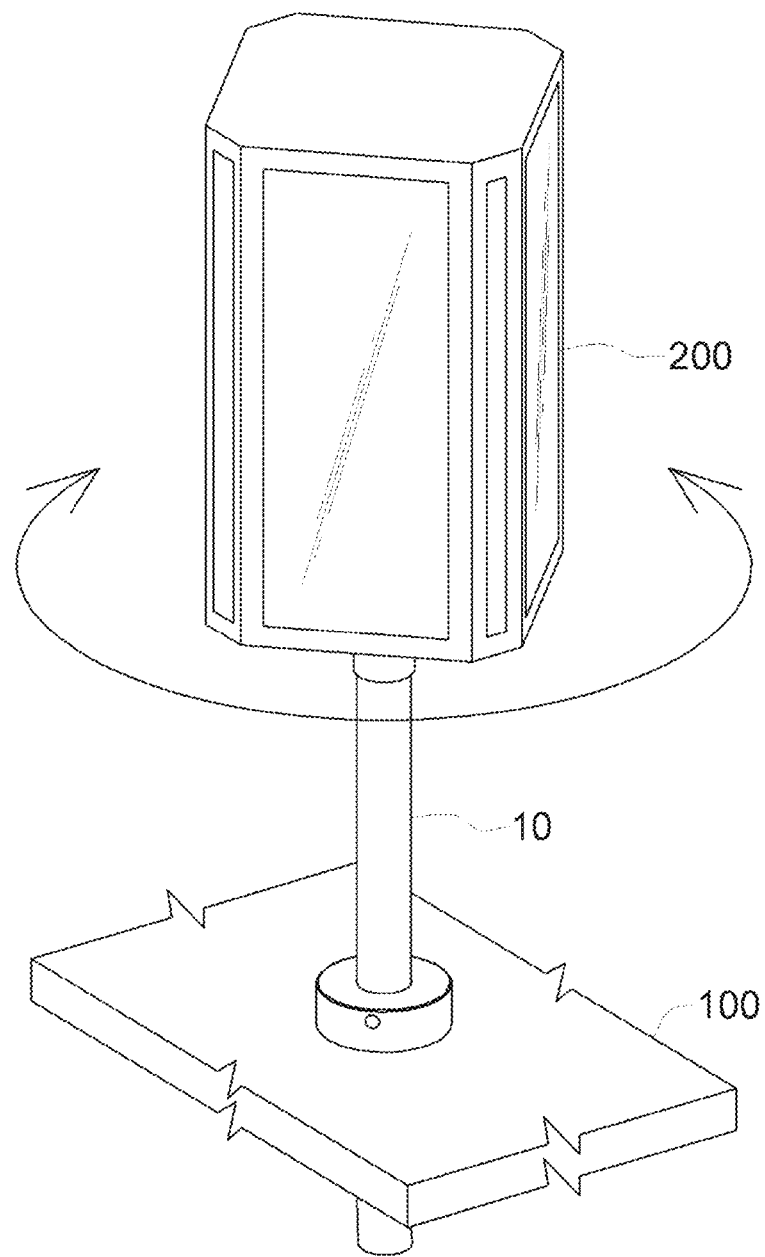

As an external force is selectively applied to the rod member 10 by means of a user, accordingly, the LCD monitor 200 can be freely rotated continuously by 360° in left and right directions (See FIGS. 4B and 5B).

The rotatable stand for an LCD monitor according to another embodiment of the present invention is configured to have the rotary bearing 70 and the snap ring 72 firmly fitted to the rod member 10 within a space portion where the support part 34 of the seating member 30 and the cover member 50 are coupled to each other on top of the casino table 100.

In this case, the snap ring 72 is firmly fitted to the snap ring installation groove 16 of the rod member 10, thereby preventing the rotary bearing 70 from escaping and also preventing the rod member 10 from escaping upward by means of an external force.

Further, one pair of support bearings 80 is fitted to the given height positions of the rod member 10 located in the insertion part 32 of the seating member 30 on the underside of the casino table 100 in such a manner as to be spaced apart from each other by a given distance through the insertion pipe 82.

If an external force is selectively applied to the rod member 10 by means of a user so as to rotate the LCD monitor 200, accordingly, the rod member 10 can be freely rotated by 360° in left and right directions by means of the operation of the rotary bearing 70 constituted of the trust ball bearing and fitted to the given height position thereof.

In this case, one pair of support bearings 80 built in the insertion part 32 of the seating member 30 is coupled to the lower end periphery of the rod member 10, and upon rotation of the rod member 10, accordingly, a rotary shaft of the rod member 10 is always supportedly maintained to a vertical state by means of one pair of support bearings 80, thereby preventing the abrasion of the respective parts and unstable rotations of the rod member 10 caused by the arbitrary movement of the rotary shaft of the rod member 10.

On the other hand, the LCD monitor applied to the rotatable stand of the present invention is desirably built with a small size computer board of a mobile base so as to remove a data transmission cable, thereby achieving more gentle rotations. As a result, a simple structure where only a power cable is connected to the interior of the rod member 10 can be made.

Further, a given gear structure is applied to the lower end periphery of the rod member 10 under the installation hole 110 of the table 100, and next, a manual handle or an automatic motor is connected to the given gear structure, thereby enabling the LCD monitor 200 to be more gently rotated.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A rotatable stand for a liquid crystal display (LCD) monitor, wherein the rotatable stand is configured to be mounted in an installation hole of a table, the rotatable stand comprising:
    a rod member having a shape of a pipe and including a top, wherein the top of the rod member is configured to allow an LCD monitor to be affixed thereto;
    a rotary bearing fitted to the rod member and configured to be engagingly rotated with the rod member;
    a seating member including:
        an insertion part having a pipe shape and adapted to pass through an installation hole of a table and
        a support part having a form of an annular flange that is configured to hang over an annular edge of the installation hole of the table and including a plurality of holes for accepting a plurality of screws thereinto and including an inner peripheral surface on which a seat for the rotary bearing is formed, wherein the rotary bearing disposed on the seat is able to rotate relative to the support part,
        wherein the support part and the insertion part are detachably coupled to each other by means of first and second screw thread structures, the first screw thread structure is formed on an inner peripheral surface of the insertion part, and the second screw thread structure is formed an outer peripheral surface of the support part; and
    a cover member for covering the seating member and the rotary bearing, wherein the cover member has a first annular groove that is formed on an upper inner side surface thereof and configured to receive the rotary bearing therein, a second annular groove that is formed on a lower part thereof and configured to receive the support part of the seating member therein, and a plurality of screw fastening holes, and wherein the plurality of screws that passes through the plurality of holes formed in the support part engages the plurality of screw fastening holes formed in the cover member so that the cover member is secured to the support part,
    wherein the rod member has a first stepped projection that is reduced in diameter so as to restrict a fitting position of the rotary bearing onto the rod member and a snap ring installation groove concavely formed on an outer peripheral surface of the rod member below the fitting position of the rotary bearing and configured to allow a snap ring to be seated therein, and
    wherein the insertion part of the seating member has a pair of support bearings built therein and spaced apart from each other by an insertion pipe so as to support the rod member.

2. The rotatable stand according to claim 1, wherein the insertion part of the seating member has a screw thread formed on a lower outer peripheral surface thereof in such a manner as to be fastened to a ring-shaped fixing member after passing through the installation hole of the table.

\* \* \* \* \*